(12) United States Patent
Chuang et al.

(10) Patent No.: US 12,041,328 B2
(45) Date of Patent: Jul. 16, 2024

(54) SHELTERING MECHANISM AND SURVEILLANCE CAMERA

(71) Applicant: VIVOTEK INC., New Taipei (TW)

(72) Inventors: Yao-Nien Chuang, New Taipei (TW); Ming-Wei Wang, New Taipei (TW)

(73) Assignee: VIVOTEK INC., New Taipei (TW)

( * ) Notice: Subject to any disclaimer, the term of this patent is extended or adjusted under 35 U.S.C. 154(b) by 175 days.

(21) Appl. No.: 17/969,674

(22) Filed: Oct. 19, 2022

(65) Prior Publication Data

US 2023/0164407 A1    May 25, 2023

(30) Foreign Application Priority Data

Nov. 23, 2021 (TW) .................................. 110143509

(51) Int. Cl.
 *H04N 23/51* (2023.01)
(52) U.S. Cl.
 CPC .................................. *H04N 23/51* (2023.01)
(58) Field of Classification Search
 CPC ...................................................... H04N 23/51
 See application file for complete search history.

(56) References Cited

U.S. PATENT DOCUMENTS

| | | | |
|---|---|---|---|
| 7,719,610 B2 * | 5/2010 | Kung | H04N 23/698 348/374 |
| 7,777,810 B2 * | 8/2010 | Kung | H04N 23/60 348/374 |
| 9,716,816 B2 * | 7/2017 | Urano | H04N 23/51 |
| 10,476,053 B2 * | 11/2019 | Grobecker | H04N 23/51 |
| 2016/0219202 A1 * | 7/2016 | Barros | A45C 13/1076 |

FOREIGN PATENT DOCUMENTS

| | | |
|---|---|---|
| CN | 113687562 A | 11/2021 |
| TW | 201521552 A | 6/2015 |
| TW | 201831937 A | 9/2018 |

* cited by examiner

*Primary Examiner* — Cynthia Segura
(74) *Attorney, Agent, or Firm* — Winston Hsu

(57) ABSTRACT

A sheltering mechanism applied to a surveillance camera and includes a sheltering component and a resilient component. The casing includes an opening. The sheltering component is slidably disposed on a casing to shelter an opening formed on the casing. The opening is surrounded by the resilient component. The resilient component includes a base portion, a bridging portion and a contacting portion. The base is fixed to the casing. The bridging component is connected to the base portion and stretches outwardly from the base portion. The contacting portion is disposed on an end of the bridging portion opposite to the base portion. The bridging portion pushes the contacting portion to contact against the sheltering component for sealing a gap between the casing and the sheltering component.

20 Claims, 4 Drawing Sheets

SHELTERING MECHANISM AND SURVEILLANCE CAMERA

BACKGROUND OF THE INVENTION

1. Field of the Invention

The present invention relates to a sheltering mechanism and a surveillance camera, and more particularly, to a sheltering mechanism of providing waterproof and dustproof functions in camera rotation and a related surveillance camera.

2. Description of the Prior Art

A conventional surveillance camera disposes the camera lens inside the case to capture the surveillance image within the specific range. The hole is formed on the case, and the fixed rod of the surveillance camera passes through the hole to connect with the wall or the ceiling. For adjusting the capturing angle of the camera lens, rotation of the camera lens drives the case to move relative to the fixed rod along the hole, so as to move the surveillance camera to the specific capturing angle relative to the wall or the ceiling. The conventional surveillance camera is often disposed on outdoor spaces, and the movable cover is disposed on the case to shelter the hole, thereby preventing water or dust from falling into the case. The case is designed into the spherical shell for an appearance demand, and the movable cover is also designed as an arc-shaped structure similar to the curve of the spherical shell for sealing the arc-shaped hole of the spherical shell. However, a gap size between the arc-shaped cover and the spherical shell is varied with angle change in the rotation of the conventional surveillance camera, and the water or dust easily falls into the spherical shell when the gap becomes larger. Therefore, design of a shelter cover of providing waterproof and dustproof functions when the spherical shell is rotated and a related surveillance camera is an important issue in the related mechanical design industry.

SUMMARY OF THE INVENTION

The present invention provides a sheltering mechanism of providing waterproof and dustproof functions in camera rotation and a related surveillance camera for solving above drawbacks.

According to the claimed invention, a sheltering mechanism includes a sheltering component and a resilient component. The sheltering component is slidably disposed on a casing and adapted to shelter an opening formed on the casing. The resilient component is disposed around the opening. The resilient component includes a base portion, a bridging portion and a contacting portion. The base portion surrounds the opening and is fixed onto the casing. The bridging portion is connected to the base portion and stretches outwardly from the base portion. The contacting portion is disposed on an end of the bridging portion opposite to the base portion. The bridging portion pushes the contacting portion and contacts against the sheltering component in a detachable manner for sealing a gap between the casing and the sheltering component.

According to the claimed invention, a surveillance camera includes an image receiver and a sheltering mechanism. The image receiver is disposed on a fixed rod and adapted receive an image. The sheltering mechanism includes a sheltering component and a resilient component. The sheltering component is slidably disposed on a casing and adapted to shelter an opening formed on the casing. The resilient component is disposed around the opening. The resilient component includes a base portion, a bridging portion and a contacting portion. The base portion surrounds the opening and is fixed onto the casing. The bridging portion is connected to the base portion and stretches outwardly from the base portion. The contacting portion is disposed on an end of the bridging portion opposite to the base portion. The bridging portion pushes the contacting portion and contacts against the sheltering component in a detachable manner for sealing a gap between the casing and the sheltering component. The image receiver is accommodated inside the casing, and the fixed rod passes through the opening on the casing.

The sheltering mechanism of the present invention can dispose the resilient component with specific design between the sheltering component and the casing. The base portion of the resilient component can attach the whole resilient component stably to the casing. The bridging portion of the resilient component can provide sufficient supporting strengthen and be cooperated with the supporting portion to contact the contacting portion tightly against the sheltering component. The sunken portion of the resilient component can be used to control the supporting force of the supporting portion, so as to ensure that the bridging portion and the supporting portion can stably hold the contacting portion, and the slip factor of the contacting portion relative to the sheltering component cannot be decreased due to the excessive supporting force. In the present invention, the opening can be designed as the long arc-typed opening in accordance with the spherical shell, and the type of the sheltering component can be designed as the related arc-typed shelter. When the fixed rod is moved inside the opening on the casing, the gap between the sheltering component and the casing may be varied with rotation of the surveillance camera; the resilient component of the present invention can utilize the bridging portion to increase the height of the contacting portion relative to the base portion. The bridging portion and the supporting portion can provide the sufficient resilient recovering force, and be bent or deformed with different amplitudes in accordance with different rotation angle of the surveillance camera, so that the contacting portion can contact against the sheltering component to achieve functions of waterproof sealing and scraping off water marks.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
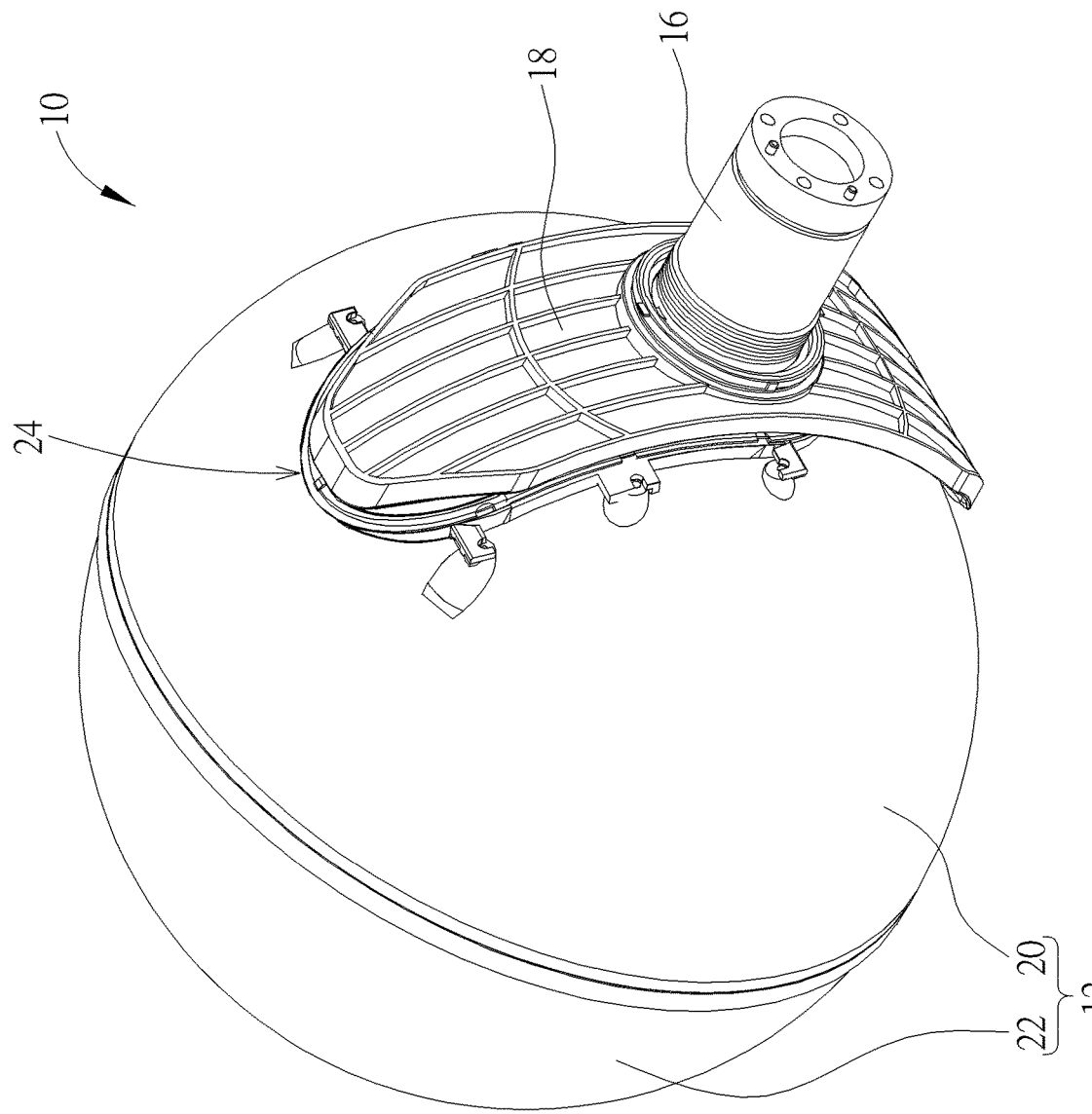
FIG. 1 is a diagram of a surveillance camera according to an embodiment of the present invention.
Figure 2:
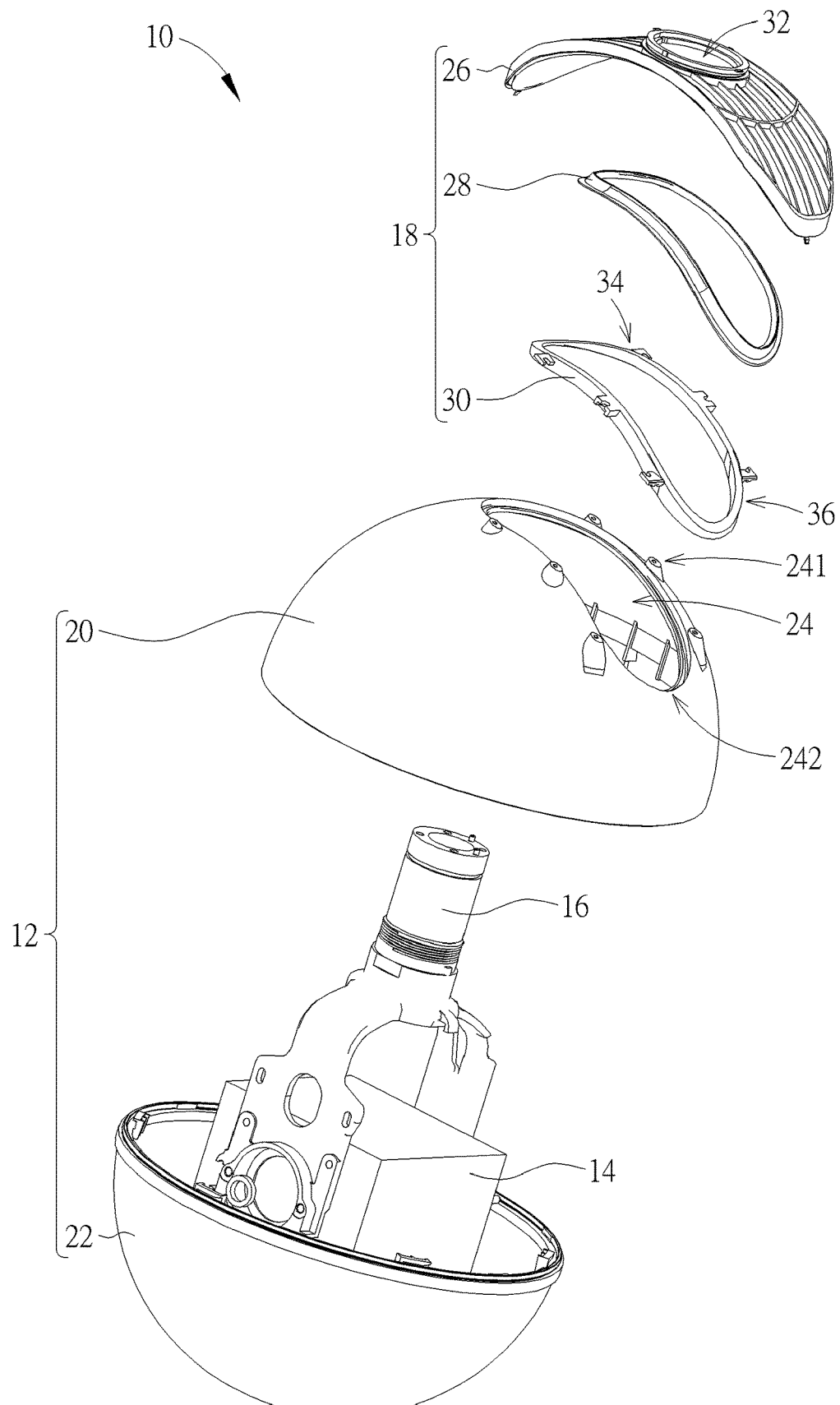
FIG. 2 is an exploded diagram of the surveillance camera according to the embodiment of the present invention.

Please refer to FIG. 1 and FIG. 2. FIG. 1 is a diagram of a surveillance camera 10 according to an embodiment of the present invention. FIG. 2 is an exploded diagram of the surveillance camera 10 according to the embodiment of the present invention. The surveillance camera 10 can include a spherical shell 12, an image receiver 14, a fixed rod 16 and a sheltering mechanism 18. The spherical shell 12 can have a first casing 20 and a second casing 22 used to accommodate the image receiver 14 and the fixed rod 16. The image receiver 14 can be disposed on the fixed rod 16 and used to receive or capture a surveillance image. A part of the fixed rod 16 can pass through an opening 24 formed on the first casing 20, and the opening 24 can be moved relative to the fixed rod 16 with rotation of the surveillance camera 10.

The sheltering mechanism 18 can include a sheltering component 26, a resilient component 28 and a bridging component 30. The fixed rod 16 can pass through a hole 32 formed on the sheltering component 26, and the sheltering component 26 can be disposed on the first casing 20 in a slidable manner for covering the opening 24. The opening 24 can be surrounded by the resilient component 28. The bridging component 30 can be assembled with the resilient component 28 and installed around the opening 24 of the first casing 20. The bridging component 30 can be an optional element used to connect the resilient component 28 and the first casing 20. For example, the first casing 20 can be an independent element, and the resilient component 28 may be adhered to the bridging component 30 and then the bridging component 30 can be fixed onto the first casing 20 via a latch or in a locking manner. In other possible embodiment, the resilient component 28 may be directly connected with the first casing 20.

It should be mentioned that the opening 24 on the first casing 20 can be designed as a long arc-typed opening. The bridging component 30 can be designed as a type similar to the long arc-typed opening, and can include a first part 34 and a second part 36 respectively corresponding to a long side 241 and a short side 242 of the long arc-typed opening. A structural height of the first part 34 can be preferably greater than a structural height of the second part 36, so that the sheltering component 26 can be fit in the opening 24 on the first casing 20 when the spherical shell 12 is rotated.

Figure 3:
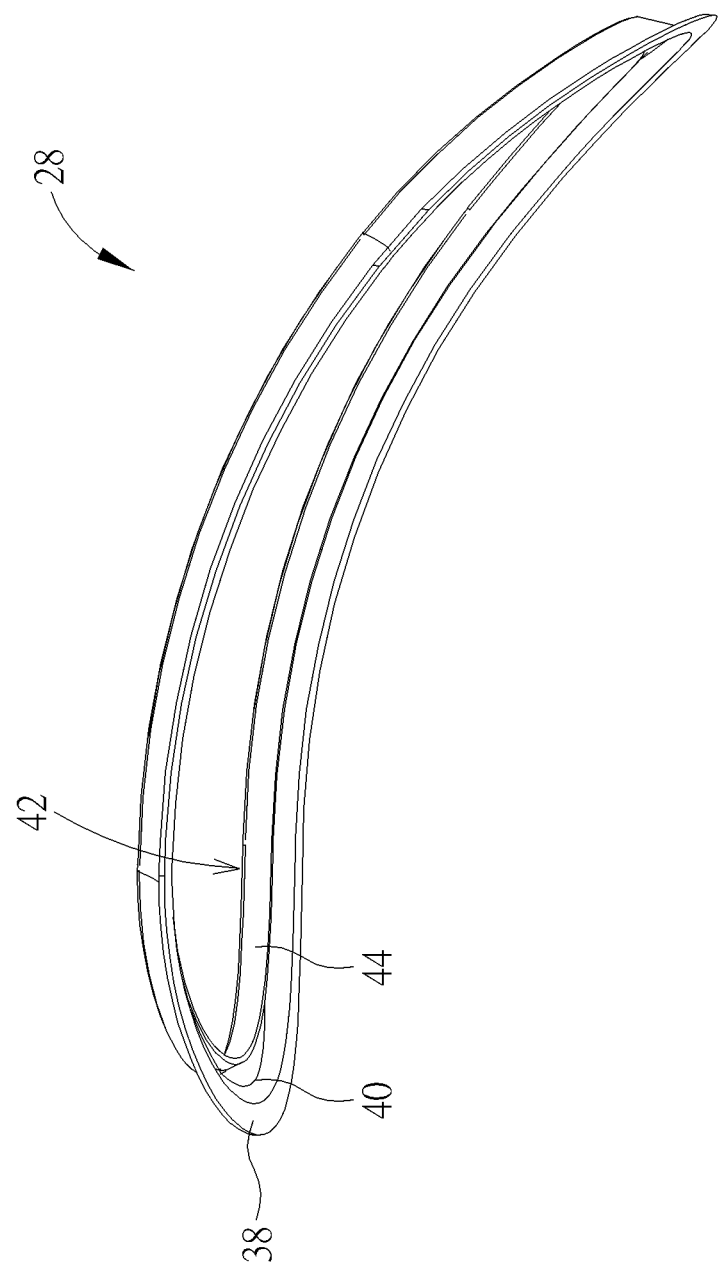
FIG. 3 is a diagram of a resilient component in another view according to the embodiment of the present invention.
Figure 4:
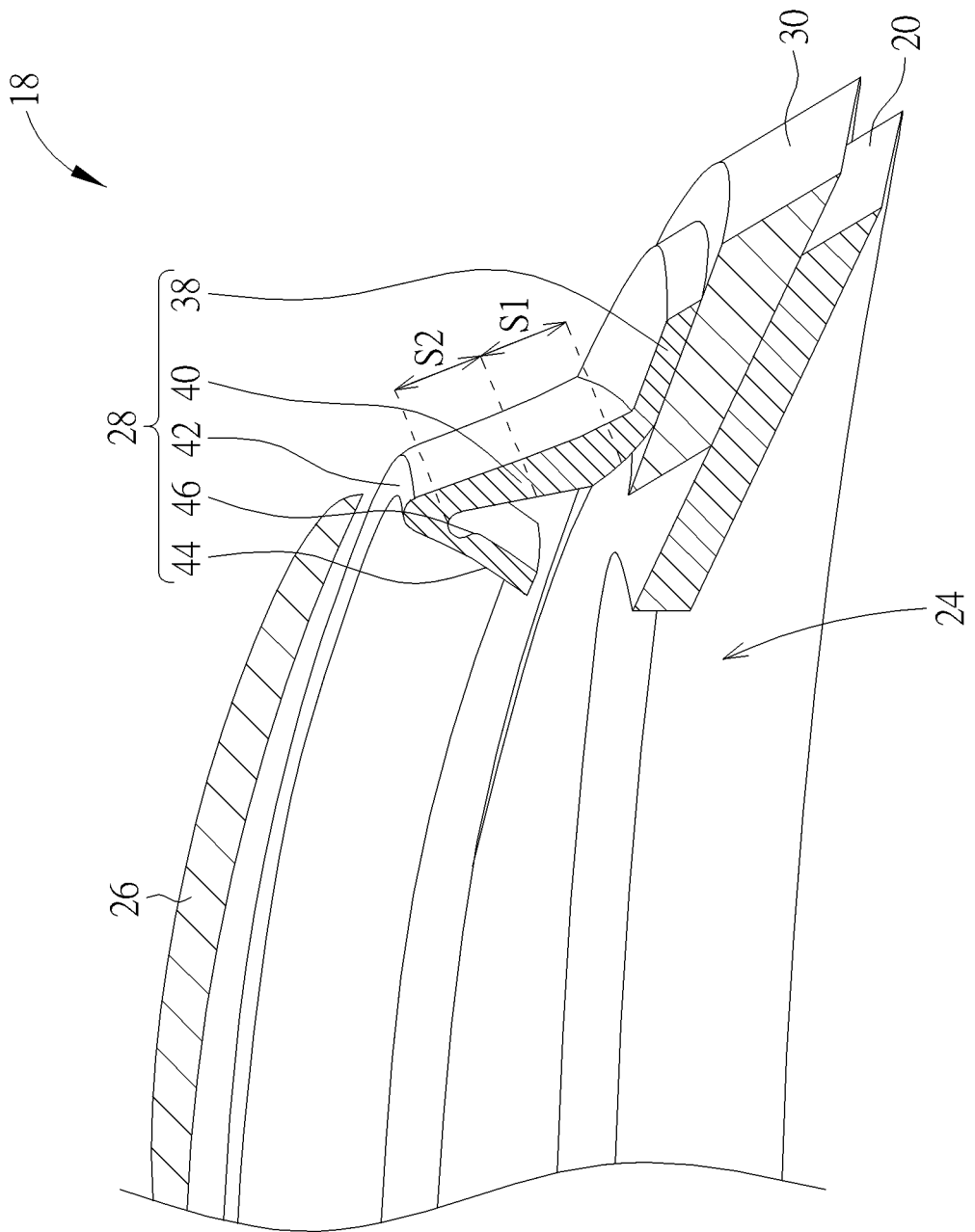
FIG. 4 is a sectional view of a sheltering mechanism according to the embodiment of the present invention.

Pleases refer to FIG. 3 and FIG. 4. FIG. 3 is a diagram of the resilient component 28 in another view according to the embodiment of the present invention. FIG. 4 is a sectional view of the sheltering mechanism 18 according to the embodiment of the present invention. The resilient component 28 can include a base portion 38, a bridging portion 40, a contacting portion 42, a supporting portion 44 and a sunken portion 46. The base portion 38 can be fixed onto the first casing 20 via the bridging component 30, so that the base portion 38 may have a large contacting surface for increasing stability of connection to the first casing 20. The bridging portion 40 can be connected to the base portion 38, and further outwardly stretched from the base portion 38 to point toward the sheltering component 26. The contacting portion 42 can be disposed on an end of the bridging portion 40 opposite to the base portion 38. The contacting portion 42 can be held by the bridging portion 40 so as to tightly contact against the sheltering component 26.

The bridging portion 40 can at least include a first section S1 and a second section S2, respectively adjacent to the base portion 38 and the contacting portion 42. A structural thickness of the first section 51 can be preferably greater than a structural thickness of the second section S2. When the resilient component 28 is pressed by the sheltering component 26, the second section S2 which has lower structural strength may be resiliently deformed for matching with a gap between the opening 24 and the sheltering component 26. The first section 51 can have preferred structural strength and used to stably hold the contacting portion 42, so as to ensure that the contacting portion 42 can contact against the sheltering component 26 and to tightly seal the gap between the first casing 20 and the sheltering component 26.

In the embodiment, the contacting portion 42 preferably can be hardened to increase a slip factor of the contacting portion 42 relative to the sheltering component 26. Some slip layer (which is not marked in the figures) can be adhered to or coated on an inner surface of the sheltering component 26 facing the resilient component 28, so as to increase the slip factor of the sheltering component 26 relative to the contacting portion 42. The sheltering component 26 and the contacting portion 42 can be simultaneously or alternatively performed to the above-mentioned process for increasing the slip factor. In other possible embodiment, the slip layer may be adhered to or coated on the contacting portion 42 and the inner surface of the sheltering component 26 can be hardened, or the slip layer may be adhered to or coated on the sheltering component 26 and the contacting portion 42 both, or the sheltering component 26 and the contacting portion 42 may be both performed by the hardened process. Any possible physical process or chemical process of increasing slide smoothness between the sheltering component 26 and the resilient component 28 can belong to a design scope of the present invention.

Besides, the supporting portion 44 can be optionally disposed on an end of the contacting portion 42 opposite to the bridging portion 40, and be stretched from the contacting portion 42 toward the first casing 20. As shown in FIG. 4, an inner edge of the opening 24 on the first casing 20 can be located under the supporting portion 44; when the resilient component 28 is deformed due to downward pressure of the sheltering component 26, the supporting portion 44 can contact against the casing 20 and used to hold the contacting portion 42 with the bridging portion 40, so that the contacting portion 42 can tightly contact against the sheltering component 26. When the sheltering component 26 is separated from the resilient component 28, a resilient recovering force of the bridging portion 40 can upwardly push the contacting portion 42 and the supporting portion to separate the supporting portion 44 from the first casing 20.

In one possible embodiment, an inner edge of the bridging component 30 can be stretched inwardly to align with the inner edge of the opening 24 on the first casing 20, and the supporting portion 44 can contact against the bridging component 30 when the resilient component 28 is compressed. In another possible embodiment, the supporting portion 44 may be optionally removed when the inner edges of the opening 24 and the bridging component 30 align with a boundary between the base portion 38 and the bridging portion 40.

The sunken portion 46 can be disposed between the contacting portion 42 and the supporting portion 44. A structural thickness of the sunken portion 46 can be smaller than a structural thickness of the supporting portion 44. The sunken portion 46 can be disposed inside or outside the supporting portion 44. The sunken portion 46 can be an optional element used to control a supporting force provided by the supporting portion 44. When the sunken portion 46 is formed on the supporting portion 44, the supporting force of the supporting portion 44 can be reduced by comparing to the supporting force of the supporting portion 44 without the sunken portion 46. In the present invention, the sunken portion 46 may be designed as a semicircular groove, and a type of the sunken portion 46 is not limited to the above-mentioned embodiment and depends on an actual demand.

In conclusion, the sheltering mechanism of the present invention can dispose the resilient component with specific design between the sheltering component and the casing. The base portion of the resilient component can attach the whole resilient component stably to the casing. The bridging portion of the resilient component can provide sufficient supporting strengthen and be cooperated with the supporting portion to contact the contacting portion tightly against the sheltering component. The sunken portion of the resilient component can be used to control the supporting force of the supporting portion, so as to ensure that the bridging portion and the supporting portion can stably hold the contacting portion, and the slip factor of the contacting portion relative to the sheltering component cannot be decreased due to the excessive supporting force. In the present invention, the opening can be designed as the long arc-typed opening in accordance with the spherical shell, and the type of the sheltering component can be designed as the related arc-typed shelter. When the fixed rod is moved inside the opening on the casing, the gap between the sheltering component and the casing may be varied with rotation of the surveillance camera; the resilient component of the present invention can utilize the bridging portion to increase the height of the contacting portion relative to the base portion. The bridging portion and the supporting portion can provide the sufficient resilient recovering force, and be bent or deformed with different amplitudes in accordance with different rotation angle of the surveillance camera, so that the contacting portion can contact against the sheltering component to achieve functions of waterproof sealing and scraping off water marks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A sheltering mechanism comprising:
a sheltering component slidably disposed on a casing and adapted to shelter an opening formed on the casing; and
a resilient component disposed around the opening, the resilient component comprising:
a base portion fixed onto the casing;
a bridging portion connected to the base portion and stretching outwardly from the base portion; and
a contacting portion disposed on an end of the bridging portion opposite to the base portion, the contacting portion being held by the bridging portion to contact against the sheltering component in a detachable manner for sealing a gap between the casing and the sheltering component.

2. The sheltering mechanism of claim 1, wherein the bridging portion at least comprises a first section adjacent to the base portion and a second section adjacent to the contacting portion, a structural thickness of the first section is greater than a structural thickness of the second section.

3. The sheltering mechanism of claim 1, wherein the resilient component further comprises a supporting portion disposed on an end of the contacting portion opposite to the bridging portion, and adapted to contact against the casing when the bridging portion is pressed and deformed.

4. The sheltering mechanism of claim 3, wherein the supporting portion is separated from the casing when the bridging portion is not pressed and deformed.

5. The sheltering mechanism of claim 3, wherein the resilient component further comprises a sunken portion disposed between the contacting portion and the supporting portion.

6. The sheltering mechanism of claim 5, wherein a structural thickness of the sunken portion is smaller than a structural thickness of the supporting portion.

7. The sheltering mechanism of claim 1, further comprising:
a bridging component assembled with the resilient component and installed on the opening of the casing.

8. The sheltering mechanism of claim 7, wherein the opening is a long arc-typed opening, the bridging component comprises a first part and a second part respectively corresponding to a long side and a short side of the long arc-typed opening, a structural height of the first part is greater than a structural height of the second part.

9. The sheltering mechanism of claim 1, wherein the contacting portion of the resilient component is hardened to increase a slip factor of the contacting portion relative to the sheltering component.

10. The sheltering mechanism of claim 1, wherein a slip layer is adhered to or coated on a surface of the sheltering component facing the resilient component so as to increase a slip factor of the sheltering component relative to the contacting portion.

11. A surveillance camera comprising:
an image receiver disposed on a fixed rod and adapted receive an image; and
a sheltering mechanism comprising:
a sheltering component slidably disposed on a casing and adapted to shelter an opening formed on the casing; and
a resilient component disposed around the opening, the resilient component comprising:
a base portion fixed onto the casing;
a bridging portion connected to the base portion and stretching outwardly from the base portion; and
a contacting portion disposed on an end of the bridging portion opposite to the base portion, the contacting portion being held by the bridging portion to contact against the sheltering component in a detachable manner for sealing a gap between the casing and the sheltering component;
wherein the image receiver is accommodated inside the casing, and the fixed rod passes through the opening on the casing.

12. The surveillance camera of claim 11, wherein the bridging portion at least comprises a first section adjacent to the base portion and a second section adjacent to the contacting portion, a structural thickness of the first section is greater than a structural thickness of the second section.

13. The surveillance camera of claim 11, wherein the resilient component further comprises a supporting portion disposed on an end of the contacting portion opposite to the bridging portion, and adapted to contact against the casing when the bridging portion is pressed and deformed.

14. The surveillance camera of claim 13, wherein the supporting portion is separated from the casing when the bridging portion is not pressed and deformed.

15. The surveillance camera of claim 13, wherein the resilient component further comprises a sunken portion disposed between the contacting portion and the supporting portion.

16. The surveillance camera of claim 15, wherein a structural thickness of the sunken portion is smaller than a structural thickness of the supporting portion.

17. The surveillance camera of claim 11, wherein the sheltering mechanism further comprises a bridging component assembled with the resilient component and installed on the opening of the casing.

18. The surveillance camera of claim 17, wherein the opening is a long arc-typed opening, the bridging component comprises a first part and a second part respectively corresponding to a long side and a short side of the long arc-typed opening, a structural height of the first part is greater than a structural height of the second part.

19. The surveillance camera of claim 11, wherein the contacting portion of the resilient component is hardened to increase a slip factor of the contacting portion relative to the sheltering component.

20. The surveillance camera of claim 11, wherein a slip layer is adhered to or coated on a surface of the sheltering component facing the resilient component so as to increase a slip factor of the sheltering component relative to the contacting portion.

* * * * *